(12) United States Patent
Prest

(10) Patent No.: US 7,510,405 B1
(45) Date of Patent: Mar. 31, 2009

(54) METHOD OF MANUFACTURING AN ELECTRONIC DEVICE WITH A UNITARY OUTER BODY

(75) Inventor: Chris Prest, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 11/861,886

(22) Filed: Sep. 26, 2007

(51) Int. Cl.
*H01R 12/00* (2006.01)
(52) U.S. Cl. .................... 439/76.1; 439/638
(58) Field of Classification Search ............. 439/76.1, 439/638, 700
See application file for complete search history.

(56) References Cited

U.S. PATENT DOCUMENTS

| | | | | |
|---|---|---|---|---|
| 5,044,965 A | * | 9/1991 | Hayasaka ............... 439/76.1 |
| 5,442,170 A | * | 8/1995 | Kreft et al. .............. 250/229 |
| 5,569,039 A | * | 10/1996 | Bailey et al. ............ 439/76.1 |
| 5,649,829 A | * | 7/1997 | Miller et al. ............ 439/76.1 |
| 5,982,624 A | * | 11/1999 | Onoda et al. ............ 361/737 |
| 6,124,716 A | * | 9/2000 | Kanamori ............... 324/538 |
| 6,626,703 B2 | * | 9/2003 | Hsin ..................... 439/638 |
| 6,932,620 B2 | * | 8/2005 | Ishiguro et al. ........... 439/66 |
| 7,149,089 B2 | * | 12/2006 | Blasko et al. ............ 361/752 |
| 7,230,833 B1 | * | 6/2007 | Sickels .................. 361/747 |

\* cited by examiner

*Primary Examiner*—Tho D Ta
(74) *Attorney, Agent, or Firm*—Townsend and Townsend and Crew LLP

(57) ABSTRACT

Various embodiments of the present invention provide for methods of manufacturing an electronic device that utilizes a unitary outer body. In one embodiment, a method is provided for installing an exterior component into an interior chamber of the unitary outer body through an opening in the outer body. The exterior component may be sized such that it cannot fit into an open end of the outer body when it is coupled with an interior component. As the unitary outer body cannot be disassembled to receive the coupled components into its interior, a method of the present invention inserts an end of the exterior component into the unitary outer body through an opening provided in the outer body to couple with the interior component.

18 Claims, 3 Drawing Sheets

METHOD OF MANUFACTURING AN ELECTRONIC DEVICE WITH A UNITARY OUTER BODY

FIELD OF INVENTION

The present invention generally relates to a method of manufacturing electronic devices and the resulting product of said method.

BACKGROUND

Personal electronic devices, such as portable media players, cellular phones, personal digital assists, are prevalent in today's marketplace, as are the peripheral electronic devices that support their use, such as docking stations and the like. As competition in the personal electronics marketplace has grown, consumers have become more demanding in terms of both the performance and design aesthetic of such devices. For example, consumers expect ever smaller electronic devices that are more convenient to carry, and also look for product exteriors that are both functional and visually appealing. An exterior body design that has gained popularity, especially in smaller form factor electronic devices, is a single-piece unitary outer body. The unitary outer body design is contrasted with more conventional designs that, for example, create a device's outer body from two halves that are secured together with fasteners.

In a unitary outer body design, a single continuous piece of material, one that is not assembled from constituent parts, is used to create the outer body of the device. This unitary outer body is provided with a hollow interior chamber to house the device's electronic components. The use of a unitary outer body reduces or eliminates the need for fasteners such as screws and pins, which reduces both the cost of production and eliminates the sometimes unsightly appearance of fasteners on the product exterior. The unitary body also eliminates gaps or fissures on the product body where body components are joined. This provides a more robust and weatherproof outer body and improves the appearance of the product. Moreover, the elimination of multiple components in the outer body of a product makes the outer body more durable, as it also eliminates the possibility that the components will come apart with wear or trauma.

Given the advantages of unitary outer body design, it is desirable to solve specific problems that arise in the manufacture of an electronic device utilizing a unitary outer body.

BRIEF SUMMARY

One embodiment of the invention is directed to a method of manufacturing an electronic device comprising a unitary outer body. A unitary outer body is provided that includes an interior chamber in communication with an open end of the body and an opening in a surface of the body. An exterior electronic component and an interior electronic component are provided. The exterior component is physically dimensioned such that the exterior component cannot pass into the chamber when it is coupled with the interior component. The interior component is positioned in the interior chamber through the open end to align an interface of the interior component with the opening. An end of the exterior component is moved into chamber through the opening and coupled with the interface of the interior component.

Another embodiment of the invention is directed to an electronic device having a unitary outer body manufactured in accordance with the methods of the invention.

These and other embodiments of the invention are described in further detail below.

DETAILED DESCRIPTION

Embodiments of the invention provide a method for manufacturing an electronic device that utilizes a unitary outer body. In particular, a method is provided for installing an exterior component into an interior chamber of the outer body through an opening in the outer body. The exterior component may be sized such that the exterior component is unable to pass into an open end of the outer body when it is coupled with an interior component. For example, the exterior component may be a connector configured to protrude from an interior circuit board when the two are coupled together in the final installation. The connector may be taller, however, than a height of the open end of the unitary outer body. As the unitary outer body cannot be disassembled to receive such a component within its interior chamber, a method of the present invention may insert an interior electronic component (e.g., the circuit board) into the chamber of the unitary outer body such that a receiving interface of the interior component is aligned with an opening provided in the outer body. An end of the exterior component may then be introduced into the chamber through the opening and secured with the receiving interface to complete the installation.

As used herein, a unitary body is formed of a single, continuous piece of material that is not assembled from constituent parts. For example, the unitary body may be formed by an extrusion process that creates a continuous hollow body with two open ends. The unitary body may also be formed using other processes, such as by a molding process or a milling process to create a hollow body with only a single open end. The unitary body may be formed from plastic, metal, ceramic or any other suitable materials commonly used to house electronic components.

Figure 1:
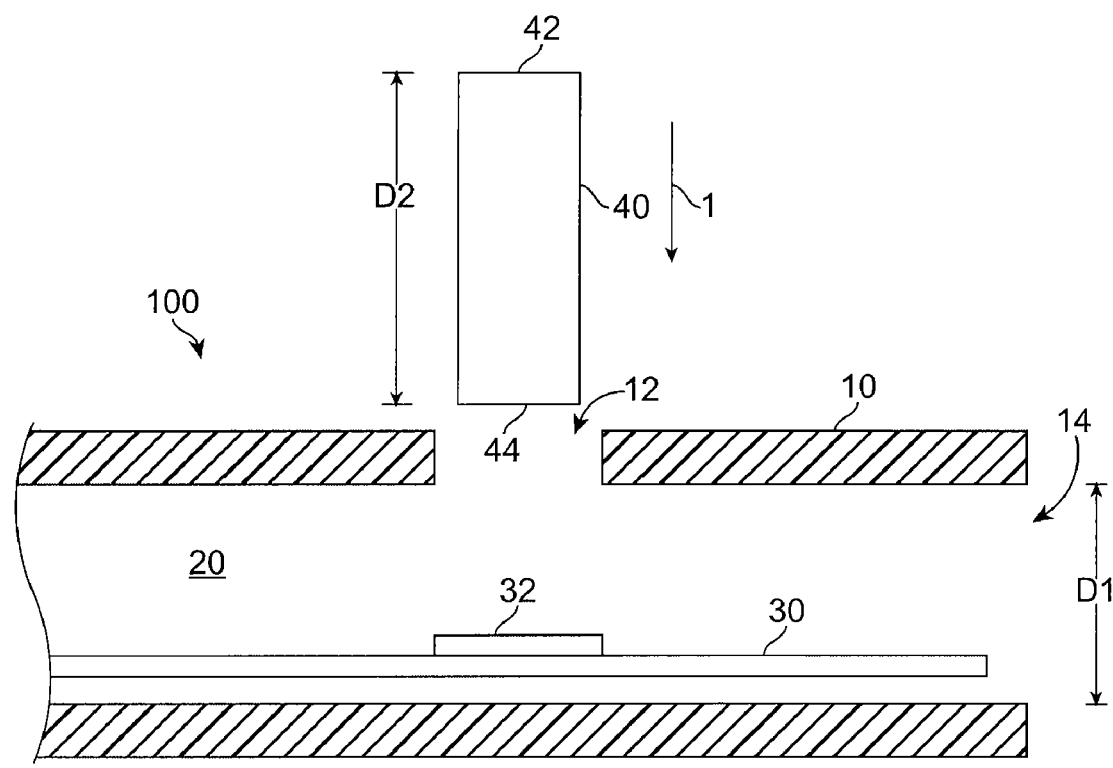
FIG. 1 shows a conceptual cross-sectional view of an electronic device in accordance with an embodiment of the present invention.

FIG. 1 shows a cross-sectional view of an electronic device that illustrates an embodiment of the present invention. In particular, electronic device 100 may include unitary outer body 10. Outer body 10 may include hollow interior chamber 20 for housing electronic components of device 100. Outer body 10 may also include opening 12 in a surface of the body, which allows components to pass into chamber 20 from the exterior of body 10. As seen in cross-section, interior chamber 20 has dimension D1 in direction 1. Body 10 may include open end 14 in communication with chamber 20 that can be used to insert electronic components into chamber 20. For example, as shown in FIG. 1, interior electronic component 30 may be disposed within chamber 20 via open end 14.

Exterior electronic component 40 may be configured for installation in direction 1 for coupling with interior component 30 disposed within chamber 20. Therefore, direction 1 can also be understood as the direction of installation of component 40. Exterior component 40 has dimension D2 in direction 1. Component 40 may be configured such that end 42 can be used to couple with another electronic device (not shown) while end 44 can be used to couple with interior component 30 at interface 32.

In instances where dimension D2 of exterior component 40 is greater than or substantially equal to dimension D1 of chamber 20, it may become difficult or impossible for a manufacturer of electronic device 100 to couple exterior component 40 with interior component 30 and then introduce the coupled components into chamber 20 through open end 14. Therefore, in accordance with an embodiment of the present invention, the device 100 may be manufactured by first disposing interior component 30 within chamber 20 such that interface 32 is aligned with opening 12. End 44 of component 40, which is configured to couple with interface 32, may then be inserted through opening 12 into chamber 20 and coupled with interface 32 to complete the manufacture of device 100. Once installed, exterior component 40 may be mechanically secured to and electrically coupled with interior component 30. A portion of exterior component 40 adjacent end 42 may protrude from outer body 10 in the installed state. Moreover, exterior component 40 may enable interior component 30 to communicate with another electronic device coupled with end 42 of component 40.

Figure 2A:
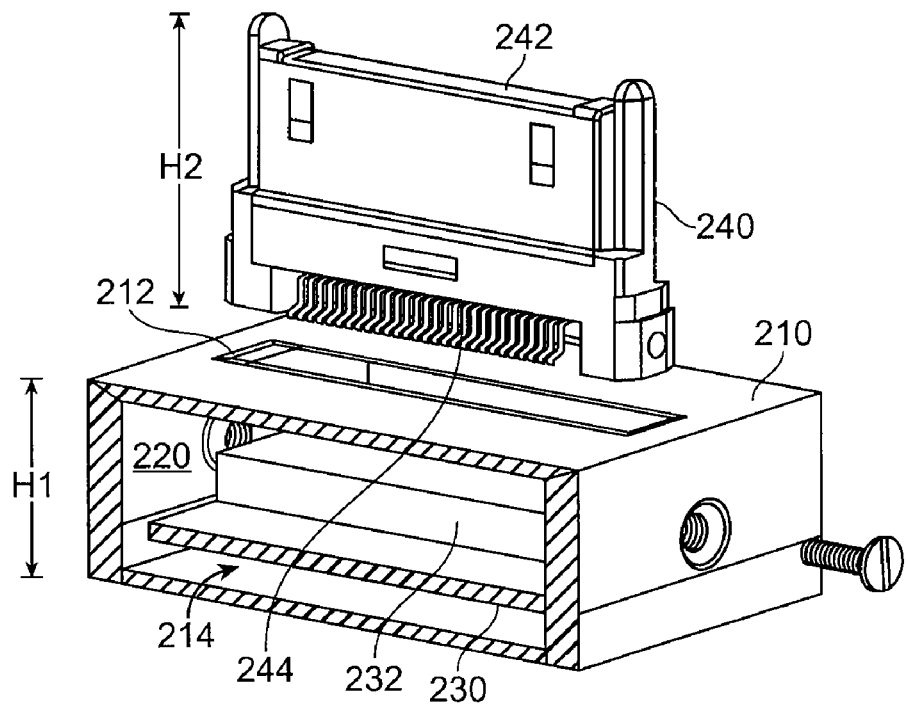
FIGS. 2A and 2B show an exemplary docking station in accordance with an embodiment of the present invention.
Figure 2B:
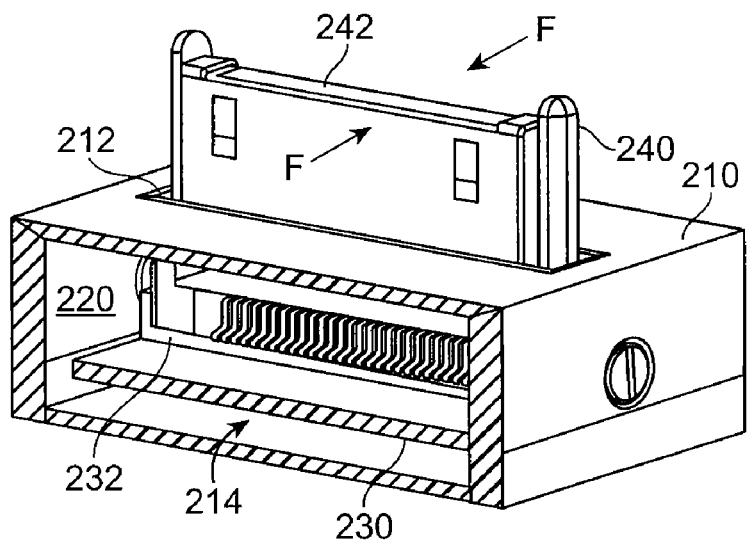

FIGS. 2A and 2B illustrate an embodiment of the present invention as applied to a docking station for a portable electronic device such as an iPod. As shown in FIG. 2A, docking station 200 may include a unitary outer body 210 that has interior chamber 220 for housing the electronic components of docking station 210. For example, printed circuit board (PCB) 230 may be configured to be disposed within chamber 220. PCB 230 may include interface 232 which may be configured to receive board interface end 244 of male 30-pin connector 240. Device interface end 242 of connector 240 may be configured to mate with a female 30-pin connector (not show), as is provided in an iPod media player, to provide both data and power transfer. The connection between end 244 and interface 232 may be configured as a board-to-board style connection and/or may be configured with spring contacts. Any other type of suitable electrical connection may also be used to electrically couple connector 240 with PCB 230. The connection may be configured to withstand significant lateral forces applied to end 242 of connector 240.

Outer body 210 may include open end 214 that enables a manufacturer to insert PCB 230 into chamber 220. Opening 212 may also be provided on outer body 210 to enable access from the exterior to chamber 220. In the context of docking station 200, it is desirable that a portion of male 30-pin connector 240 adjacent device interface end 242 protrudes from body 210 so as to enable the protruding portion to be inserted into and coupled with a female 30-pin connector (not shown). Therefore, docking station 200 may be configured with height H2 of connector 240 being greater than height H1 of outer body 210. This spatial configuration renders it impossible to manufacture docking station 200 (with unitary body 210) by inserting connector 240 and PCB 230 in a coupled state into chamber 220. Rather, docking station 200 may be manufactured by first inserting PCB 230 into chamber 220 via open end 214 such that interface 232 is aligned with opening 212. Board interface end 244 of connector 240 may then be inserted through opening 212 into chamber 220 and coupled with aligned interface 232.

As shown in FIG. 2B, the installed connector 240 may be securely coupled with interface 232 disposed on PCB 230. A portion of connector 240 may protrude from body 210 so as to enable device interface end 242 to be mated with a female 30-pin connector (not shown). As shown in FIGS. 2A and 2B, screw hole 216 may be provided in body 210 and screw 250 may be installed to secure the connection between board interface end 244, interface 232, and outer body 210.

Figure 3:
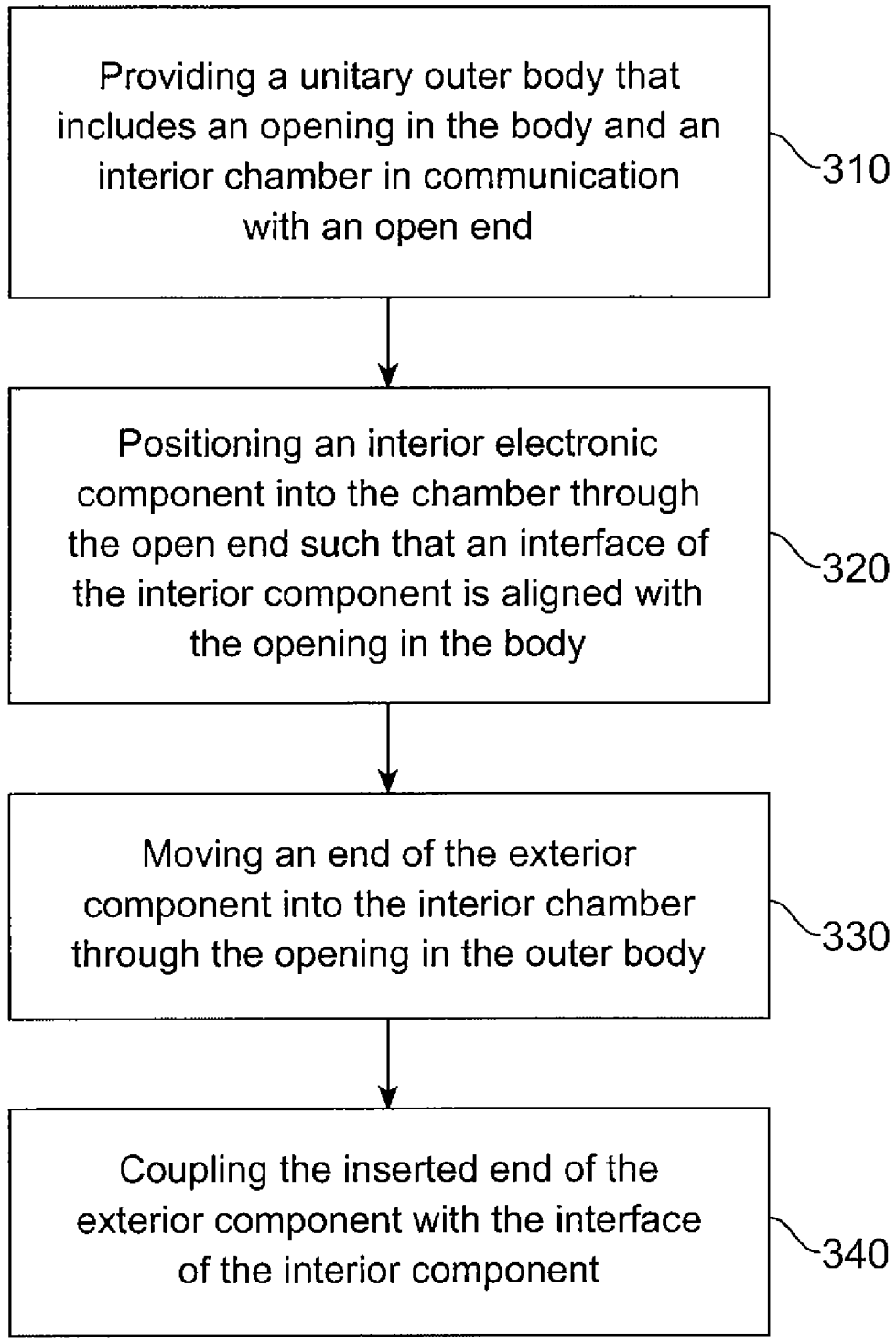
FIG. 3 is a flow diagram illustrating a method in accordance with the present invention.

FIG. 3 is a flow chart illustrating a method for manufacturing an electronic device that includes a unitary outer body, an interior electronic component, and an exterior electronic component in accordance with an embodiment of the present invention. At a first step 310, a unitary outer body may be provided that includes an interior chamber in communication with an open end and an opening configured to allow a portion of the exterior electronic component to pass into an interior chamber. For example, with reference to FIG. 2A, unitary body 210 may be provided having interior chamber 220 in communication with open end 214 and an opening 212 configured to allow an end of connector 240 to enter chamber 220. At step 320, an interior electronic component may be positioned into the interior chamber through the open end of the body such that an interface of the interior component is aligned with the opening in the body. For example, with continued reference to FIG. 2A, PCB 230 may be inserted into chamber 220 through open end 214 such that interface 232 is aligned with opening 212.

At step 330, an end of an exterior electronic component is moved into the interior chamber through the opening in the outer body. For example, board interface end 244 of connector 240 may be moved into chamber 220 through opening 212. The exterior component may be sized such that, when coupled with the interior component, the combination cannot be passed into the interior chamber of the body. For example, connector 240 may have height H2 such that, when coupled with PCB 230, the coupled components cannot pass into open end 214 having height H1. At step 340, the inserted end of the exterior component is coupled with the interface of the interior component. For example, board interface end 244 of connector 240 is coupled with interface 232 so as to electrically couple PCB 230 with connector 240.

It should be apparent to one skilled in the art that various changes and modifications can be made to this disclosure, and equivalents employed, without departing from the spirit and scope of the invention. Elements shown with any embodiment are exemplary for the specific embodiment and can be used on other embodiments within this disclosure. The above embodiments are provided for the purpose of illustration and not of limitation. The present invention is only limited by the following claims.

What is claimed is:

1. A method of manufacturing a docking station for an electronic device, the method comprising:

providing a unitary outer body that includes an interior chamber in communication with an open end of the body and an opening in a surface of the body;

providing an exterior electronic component and an interior electronic component, wherein the exterior component is physically dimensioned such that the exterior component cannot pass into the chamber when coupled with the interior component, and wherein the interior and exterior electronic components are configured to be fixed together for operation in the docking station;

positioning the interior component into the interior chamber through the open end to align an interface of the interior component with the opening;

moving an end of the exterior component into the chamber through the opening; and coupling the end of the exterior component with the interface of the interior component such that the interior and exterior components are fixed together and capable of operating together in the docking station;

wherein providing a unitary outer body comprises providing a body formed of a single, continuous piece of material.

2. The method of claim 1 wherein the unitary outer body is not formed from constituent parts.

3. The method of claim 1 wherein providing a unitary outer body comprises forming the unitary outer body using one of an extrusion, molding, or milling process.

4. The method of claim 1 wherein providing a unitary outer body comprises providing a body formed of plastic, metal, or ceramic material.

5. The method of claim 1 wherein providing a unitary outer body comprises providing a body with two open ends in communication with the chamber.

6. The method of claim 1 wherein providing an exterior component comprises providing a male 30-pin connector.

7. The method of claim 1 wherein providing an interior component comprises providing a printed circuit board.

8. The method of claim 1 wherein coupling the end of the exterior component with the interface of the interior component comprises inserting a board interface end of a male 30-pin connector into a spring loaded interface disposed on a printed circuit board.

9. The method of claim 1 wherein coupling the end of the exterior component with the interface of the interior component comprises electrically coupling the exterior component with the interior component.

10. A docking station for an electronic device, comprising:
   a unitary outer body that includes an interior chamber in communication with an open end of the body and an opening in a surface of the body;
   a circuit board disposed within the interior chamber; and
   a connector including a device interface end configured to couple with the electronic device and a board interface end fixed to the circuit board, wherein the connector is physically dimensioned such that the connector cannot pass into the interior chamber when coupled with the circuit board,
   wherein the circuit board is disposed within the interior chamber such that an interface of the circuit board is aligned with the opening in the body, and
   wherein the device interface of the connector protrudes from the interior chamber through the opening for coupling with the electronic device;
   wherein the unitary outer body is formed of a single, continuous piece of material.

11. The docking station of claim 10 wherein the unitary outer body is not formed from constituent parts.

12. The docking station of claim 10 wherein the unitary outer body is formed using one of an extrusion, molding, or milling process.

13. The docking station of claim 10 wherein the unitary outer body comprises plastic, metal, or ceramic material.

14. The docking station of claim 10 wherein the unitary outer body comprises two open ends in communication with the chamber.

15. The docking station of claim 10 wherein the connector comprises a male 30-pin connector.

16. The docking station of claim 10 where the device interface end is configured to couple with a media player.

17. The docking station of claim 10 wherein the device interface end is configured to transmit power and data to the electronic device.

18. The docking station of claim 10 wherein the interface comprises a spring loaded interface.

* * * * *